F. WILKINSON.
Apparatus for Treating Wool Preparatory to Carding or Spinning.
No. 149,085. Patented March 31, 1874.
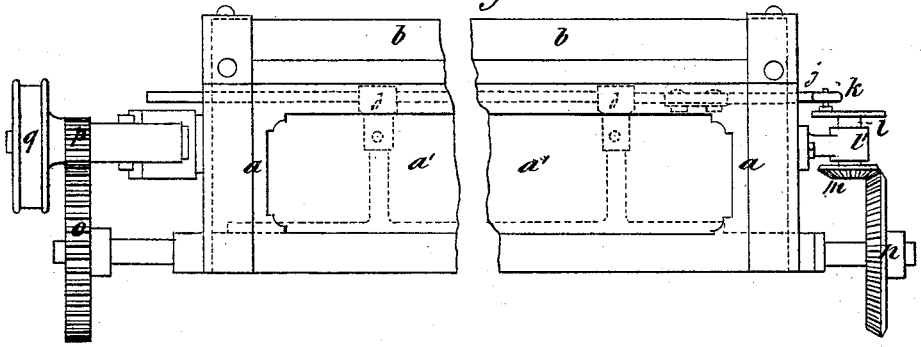
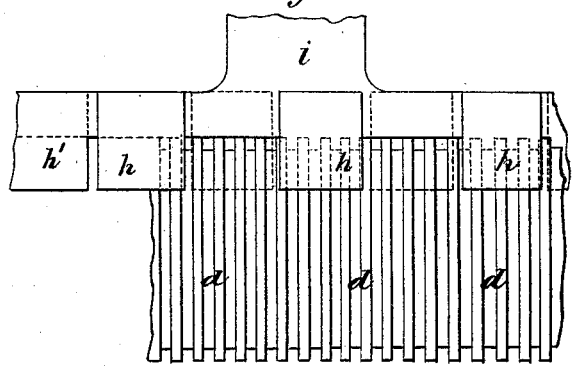
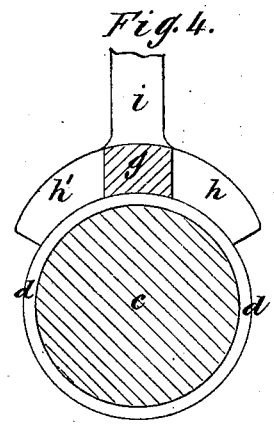
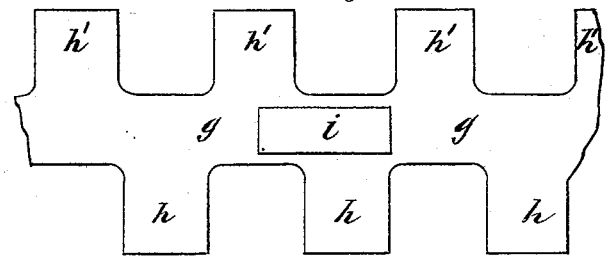
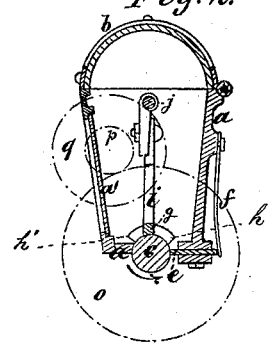
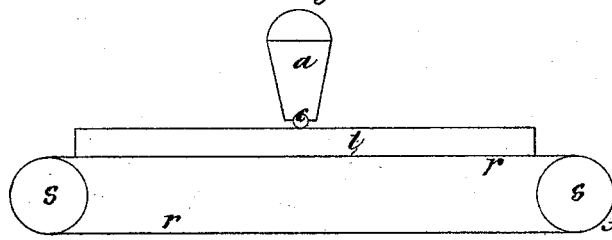
Witnesses:
Inventor:
Frederick Wilkinson
Per
Attorneys.

UNITED STATES PATENT OFFICE.

FREDERICK WILKINSON, OF MANCHESTER, ENGLAND.

IMPROVEMENT IN APPARATUS FOR TREATING WOOL PREPARATORY TO CARDING OR SPINNING.

Specification forming part of Letters Patent No. 149,085, dated March 31, 1874; application filed July 10, 1873.

*To all whom it may concern:*

Be it known that I, FREDERICK WILKINSON, of Manchester, in the county of Lancaster, Great Britain, have invented new and useful Improvements in Apparatus for Treating Wool Preparatory to Carding or Spinning, of which the following is a specification:

The invention consists in means by which some slippery powder, as French chalk or equivalent, may be conveniently mingled with wool to be carded or spun, all as hereinafter described.

In the accompanying drawing, Figure 1 represents, in side elevation, a view of the apparatus for distributing the aforesaid powder. Fig. 2 is a cross-section thereof; and Figs. 3, 4, and 5 are detached views (full size) of certain of the parts.

$a$ is a hopper, provided at top with a hinged lid, $b$, and an aperture at its bottom, which is filled up by a roller, $c$, formed with annular grooves $d$, as shown in the detached views, Figs. 3 and 4. Fitting into grooves, and upon the outer circumference of the roller $c$, is a thin plate, $e$, which extends through a slit formed in the bottom of the hopper $a$, and which is pressed forward by springs $f$. Resting upon the upper surface of the roller $c$ is a saddle-piece, $g$, provided with projecting parts $h\ h'$, the one series opposite to the spaces between those constituting the other series, as seen in the detached views, Figs. 3, 4, and 5. From the saddle-piece $g$ arms $i$ extend upward, and are connected to the rod $j$, which extends through the length of the hopper $a$, and is connected at one end to a crank-pin, $k$, mounted on a stud, $l$, which is carried by a bracket, $l'$, extending from the hopper $a$. This stud has a bevel-pinion, $m$, taking in a wheel, $n$, mounted on the axis of the roller $c$, the other end of the said roller being provided with a spur-wheel, $o$, in gear with a pinion, $p$, mounted on a stud, which is carried by the hopper $a$, and having on its outer end a pulley, $q$. To this pulley rotatory motion is communicated from any moving part of the machinery to which the apparatus is applied, and the roller $c$, through the medium of the wheel and pinion $o\ p$, is caused to revolve in the direction of the arrow, while, at the same time, the saddle-piece $j$ and its projecting parts $h\ h'$ are caused to reciprocate by means of the crank-pin $k$, driven by the wheel and pinion $m\ n$. The powder to be distributed is placed in the hopper $a$ by opening the lid $b$, and falls, consequently, upon the roller $c$, filling the grooves $d$ thereof, and as the said roller revolves, the plate $e$ scrapes it from the said grooves and leaves it at liberty to fall, and the reciprocating motion of the parts $h\ h'$ insures an equal filling of the grooves. At $a$ is a glass front to the hopper, to indicate the quantity of powder present, and to facilitate its descent. In applying this apparatus to the purpose of my invention I place the hopper $a$ above the lattice or creeper $r$, as in Fig. 6, and the powder delivered by the roller $c$ falls gradually onto the wool as it passes forward, which wool, according to my invention, may not be oiled, as is now the practice; but I may state that when, according to the ordinary practice, fifty quarts of oil would be used for a given quantity of wool, I find twenty-five quarts of oil and twelve pounds of the powder to answer equally well in short wools, the powder being in place of the omitted quantity of oil. Sufficient powder may be used at the scribbler to serve for the carding-engine as well; or my invention may be adapted to both those machines, or to any other preparatory process.

The quantity of powder necessary to be used for a given weight of wool can be readily determined by an experienced hand.

Having thus described my invention, what I claim as new, and desire to secure by Letters Patent, is—

The combination of hopper $a$, grooved roller $c$, reciprocating saddle $g$, having projections $h\ h'$, and plate $e$, as and for the purposes described.

FREDERICK WILKINSON.

Witnesses:
W. TUDOR HEABLES,
ROBT. ROBSON.